United States Patent [19]

Greaves

[11] Patent Number: 5,093,005
[45] Date of Patent: Mar. 3, 1992

[54] METHOD FOR CONTROLLING SCALE

[75] Inventor: Brian Greaves, Runcorn, United Kingdom

[73] Assignee: W. R. Grace & Co.-Conn., New York, N.Y.

[21] Appl. No.: 705,445

[22] Filed: May 24, 1991

Related U.S. Application Data

[62] Division of Ser. No. 454,101, Dec. 20, 1989, Pat. No. 5,049,304.

[30] Foreign Application Priority Data

Dec. 20, 1988 [GB] United Kingdom ............... 8829612

[51] Int. Cl.$^5$ ............................ C02F 5/10; C02F 1/10
[52] U.S. Cl. .................................. 210/700; 210/701; 252/180; 252/181
[58] Field of Search ............... 210/699, 700; 252/180, 252/181, 82, 86

[56] References Cited

U.S. PATENT DOCUMENTS

| | | | |
|---|---|---|---|
| 3,429,914 | 2/1969 | Crutchfield et al. | 562/12 |
| 3,671,448 | 6/1972 | Kowalski | 252/180 |
| 3,891,568 | 6/1975 | Nishio et al. | 252/181 |
| 4,008,164 | 2/1977 | Watson et al. | 252/180 |
| 4,406,811 | 9/1983 | Christensen et al. | 252/389.22 |
| 4,563,284 | 1/1986 | Amjad | 252/180 |
| 4,566,974 | 1/1986 | Mosler, III et al. | 252/180 |
| 4,600,524 | 7/1986 | Cuisia et al. | 252/86 |
| 4,640,793 | 2/1987 | Persinski et al. | 252/84 |
| 4,806,259 | 2/1989 | Amjad | 252/87 |

Primary Examiner—Prince Willis, Jr.
Assistant Examiner—James M. Silberman
Attorney, Agent, or Firm—James P. Barr

[57] ABSTRACT

A method for the treatment of an aqueous system, typically hard water in a cooling system, is described which comprises adding thereto:

(i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof, (ii) an amino phosphonic acid having the formula:

$$H_2—PO_3(CH_2)_n—N(R_1)(R_2)$$

in which $R_1$ and $R_2$ independently represent hydrogen, alkyl, especially of 1 to 4 carbon atoms, $—(CH_2)_nPO_3H_2$, or $—(CH_2)_nCOOH$, and n is 1 or 2, or a water-soluble salt thereof, and (iii) an aminophosphonic acid oxide of the formula:

$$H_2—PO_2(CH_3)_n—N→O)(R_1)(R_2)$$

in which $R_1$, $R_2$ and n are as defined above, or a water-soluble salt thereof.

17 Claims, No Drawings

METHOD FOR CONTROLLING SCALE

This is a division of application Ser. No. 454,101, filed Dec. 20, 1989 now U.S. Pat. No. 5,049,304.

The present invention relates to the treatment of aqueous systems, and, more particularly, to inhibiting and removing scale which forms in cooling systems.

It is well known that when water, especially hard water, is heated scale forms on the surfaces which come into contact with the water. Thus scale also forms on the hot surfaces which come into contact with cooling water. Scale also forms in boilers.

A variety of different synthetic and naturally occurring chemicals has been employed as additives to the water in order to try and reduce the formation of scale. The reason for this is that as the scale builds up there is a reduction in heat transfer across the heat exchange surfaces and, in some instances, localised over-heating can occur.

As indicated, a variety of different chemicals including water soluble polymers, phosphonates and chelating agents has been used to combat scale formation. It has now been found, according to the present invention, that particularly good scale inhibition can be obtained by using a combination of three particular types of phosphonate. According to the present invention there is provided a method for treating an aqueous system, especially a boiler water or cooling system, which comprises adding thereto;

(i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof, (ii) an amino phosphonic acid having the formula:

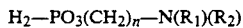

in which $R_1$ and $R_2$ independently represent hydrogen, alkyl, of 1 to 4 carbon atoms, $-(CH_2)_nPO_3H_2$, or $-(CH_2)_nCOOH$ and n is 1 or 2, or a water-soluble salt thereof, and (iii) an aminophosphonic acid oxide of the formula:

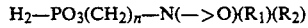

in which $R_1$, $R_2$ and n are as defined above, or a water-soluble salt thereof.

It has surprisingly been found that the use of these three phosphonates in combination gives more effective scale inhibition than the use of any of the phosphonates individually or any combination of two of them. Further, while it has been proposed to use the specified phosphono carboxylic acids and the amino phosphonates this has been for the purpose of inhibiting corrosion in cooling systems and not for the prevention of scale.

The present invention has particular applicability in hard water systems where scale is due principally to the formation of calcium carbonate, typically at least 300 ppm calcium hardness combined with 300 ppm M alkalinity at cooling water temperatures e.g. 40°–50° C., or equivalent amounts under different water conditions. It is particularly surprising that the combination is so effective because the conversion of the amino phosphonate to the corresponding N-oxide results in a material with lower calcium tolerance than the initial amino phosphonate. One of skill in the art will appreciate that low calcium tolerance is detrimental to an additive which is to be used as a scale inhibitor in waters having a high calcium content because this will give rise to the precipitation of calcium phosphonate which not only eliminates the phosphonate as a scale inhibitor but also causes scaling of calcium phosphonate.

The amino phosphonate employed is preferably one in which $R_1$ and $R_2$ both represent methyl phosphonate i.e. the compound is amino tri(methylene phosphonic acid) (ATMP). While the oxide used need not necessarily be the oxide corresponding to the amino phosphonate employed it will normally be convenient to do so. The preferred oxide is amino tri(methylene phosphonic acid)-N-oxide (i.e. $R_1$ and $R_2$ both represent methyl sulphonic acid (ATMP—N—O).

Component (i) preferably possesses the general formula:

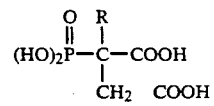

wherein R is hydrogen, alkyl, alkenyl or alkynyl having up to 4 carbon atoms; phenyl; cycloalkyl having 3 to 6 carbon atoms; benzyl; phenethyl or

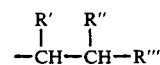

wherein R' is hydrogen, alkyl having 1 to 4 carbon atoms or carboxyl, R" is hydrogen or methyl and R"' is carboxyl or phosphonate. 2-phosphonobutane-1,2,4-tricarboxylic acid (PBTC), a commercially available material, is particularly preferred. Another preferred material is 2,4-diphosphonobutane-1,2-dicarboxylic acid.

If the phosphonates are used in the form of salts, typical salts include alkali metal, especially sodium or potassium, ammonium or lower amine salts such as salts of mono-, di- or tri-ethanolamine.

The total amounts of each component incorporated in the aqueous system can vary between quite wide limits but, in general, amounts from 0.1 to 50 ppm of each component is present. Preferably the amount of each component is 1.0 to 20 ppm, especially 1 to 12 ppm. Although the components can be added separately to the system it will normally be convenient to add them together as a formulation.

Accordingly, the present invention also provides a composition suitable for addition to an aqueous system which comprises components (i, ii and iii) as defined above; typically as an aqueous solution. Any water can be used provided the components do not precipitate; the use of base exchanged water is preferred.

In such compositions component (i) will normally be present in an amount from 15 to 90%, preferably 40 to 70% and especially 55 to 45% by weight (active). The amount of amino phosphonic acid (component (ii)) will generally be from 35 to 5%, preferably 30 to 15%, and especially 20 to 25% by weight (active) while the amount of oxide will generally be from 50 to 5%, preferably 30 to 15%, and especially 25 to 30% by weight (active). A preferred formulation comprises 3 to 6% by weight (active) PBTC, 1.5 to 3% by weight (active) of ATMP and 1.5 to 3% by weight (active) of ATMP—N—O in base exchanged, or soft, water.

In addition to the three phosphonates it is possible to incorporate into the composition or add to the aqueous system other chemicals used in the treatment of aqueous systems. Such materials include scale inhibiting polymers such as polyacrylic and polymethacrylic acids, typically having a molecular weight from 1000 to 5000, dispersants such as sulphonated polymers e.g. copolymers of acrylic or methacrylic acid and 2-methyl-2-acrylamido propane sulphonic acid, and copolymers of maleic acid and alkylsulphonic or styrene sulphonic acids, and azoles such as benzotriazole, tolytriazole, and mercaptobenzotriazole.

Such scale inhibiting polymers and dispersants will normally be present in the aqueous system in an amount from 1 to 10 ppm, preferably 1 to 5 ppm, while the azoles will normally be present in an amount from 1 to 10 ppm, preferably 1 to 3 ppm. In the compositions according to the present invention the scale inhibiting polymers and dispersants will normally be present in an amount from 30 to 50% by weight, and the azoles will normally be present in an amount from 20 to 50% by weight, based on the total weight of phosphonate. In the preferred formulation mentioned above, the scale inhibiting polymers and dispersants will typically be present in an amount from 2 to 3% by weight while the corresponding amount of azole will be 1 to 2% by weight.

The following examples further illustrate the present invention.

EXAMPLE

Tests were carried out on a laboratory simulated cooling system involving the use of a heat exchanger and cooling tower, the conditions and test results being as follows:

System water: 600 ppm calcium hardness/600 ppm "M" alkalinity
Water temperature: 40° C.
Water Flow Rate in Heat Exchanger: 0.3 ft/sec.
pH: 9.3

| Test No. | Additive | Dose ppm | Scaling Rate, mg/24 hours |
|---|---|---|---|
| 1 | ATMP | 1.5 | |
| | ATMP-N-O | 1.5 | 80** |
| | PBTC | 3.0 | |
| 2 | ATMP | 3.0 | |
| | PBTC | 3.0 | 180 |
| 3 | ATMP-N-O | 3.0 | |
| | PBTC | 3.0 | 460 |
| 4 | PBTC | 6.0 | 338* |
| 5 | ATMP | 6.0 | 225* |
| 6 | ATMP-N-O | 6.0 | 239* |

*Heavy precipitation of calcium carbonate in the circulating water.
**No visible precipitation in the circulating water.

If no additive is used, scaling will take place and, in addition, calcium carbonate will precipitate in the bulk water phase causing very significant system fouling.

It can thus be seen that the use of the combination of three phosphonates results in very much less scaling than would be expected from the behaviour of the individual components or combinations of two of the three components.

I claim:

1. A method for the treatment of an aqueous system which comprises adding thereto;

(i) a phosphonocarboxylic acid which contains at least 3 acid groups which are carboxylic and phosphonic acid groups, such that at least one acid group is a carboxylic acid group and at least one acid group is a phosphonic acid group, at least the said 3 acid groups being attached to carbon atoms, or a water-soluble salt thereof, (ii) an amino phosphonic acid having the formula:

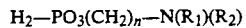

in which $R_1$ and $R_2$ independently represent hydrogen, alkyl, of 1 to 4 carbon atoms, —$(CH_2)_n PO_3 H_2$, or —$(CH_2)_n COOH$, and n is 1 or 2, or a water-soluble salt thereof, and (iii) an aminophosphonic acid oxide of the formula:

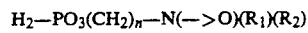

in which $R_1$, $R_2$ and n are as defined above, or a water-soluble salt thereof.

2. A method according to claim 1 in which the amino phosphonic acid is amino tris(methylene phosphonic acid).

3. A method according to claim 1 in which the amino phosphonic acid oxide is amino tri(methylene phosphonic acid)-N oxide.

4. A method according to claim 1 in which the phosphonic carboxylic acid possesses the general formula:

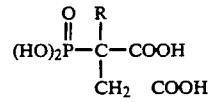

wherein R is hydrogen, alkyl, alkenyl or alkynyl having up to 4 carbon atoms; phenyl; cycloalkyl having 3 to 6 carbon atoms: benzyl; phenethyl or

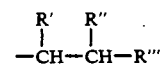

wherein R' is hydrogen, alkyl having 1 to 4 carbon atoms or carboxyl, R" is hydrogen or methyl and R''' is carboxyl or phosphonate.

5. A method according to claim 4 in which the phosphonocarboxylic acid is 2-phosphonobutane-1,2,4-tricarboxylic acid.

6. A method according to claim 1 in which components (i) and (ii) and (iii) are present in an amount from 0.1 to 50 ppm.

7. A method according to claim 6 in which components (i) and (ii) and (iii) are present in an amount from 1 to 12 ppm.

8. A method according to claim 1 in which the aqueous system is a cooling water system.

9. A method according to claim 1 in which the aqueous system is a hard water system.

10. A method according to claim 1 in which at least one of a scale inhibiting polymer, dispersant or azole is also added to the system.

11. A method according to claim 10 in which the scale inhibiting polymer is a polyacrylic or polymethacrylic acid having a molecular weight from 1,000 to 5,000 um.

12. A method according to claim 10 in which the dispersant is a copolymer of acrylic or methacrylic acid and 2-methyl-2-acrylamido-propane sulphonic acid or a copolymer of maleic acid and allyl sulphonic or styrene sulphonic acid.

13. A method according to claim 10 in which the azole is benzotriazole, tolyltriazole or mercaptobenzotriazole.

14. A method according to claim 10 in which the scale inhibiting polymer or the dispersant is present in an amount from 1 to 10 ppm.

15. A method according to claim 14 in which the scale inhibiting polymer or dispersant is present in an amount from 1 to 5 ppm.

16. A method according to claim 10 in which the azole is present in an amount from 1 to 10 ppm.

17. A method according to claim 16 in which the azole is present in an amount from 1 to 3 ppm.

* * * * *